US007395579B2

(12) United States Patent
Oh

(10) Patent No.: US 7,395,579 B2
(45) Date of Patent: Jul. 8, 2008

(54) CYCLONE DUST COLLECTING DEVICE AND VACUUM CLEANER HAVING THE SAME

(75) Inventor: Jang-keun Oh, Gwangju (KR)

(73) Assignee: Samsung Gwangju Electronics Co. Ltd., Gwangju (KR)

( * ) Notice: Subject to any disclaimer, the term of this patent is extended or adjusted under 35 U.S.C. 154(b) by 856 days.

(21) Appl. No.: 10/832,346

(22) Filed: Apr. 27, 2004

(65) Prior Publication Data

US 2004/0231091 A1 Nov. 25, 2004

(30) Foreign Application Priority Data

May 21, 2003 (KR) ...................... 10-2003-0032152

(51) Int. Cl.
*A47L 9/16* (2006.01)
*B01D 45/12* (2006.01)

(52) U.S. Cl. .......................................... 15/347; 15/353

(58) Field of Classification Search .................. 15/347, 15/353; 55/345, 337
See application file for complete search history.

(56) References Cited

U.S. PATENT DOCUMENTS

| | | | | |
|---|---|---|---|---|
| 5,254,147 | A * | 10/1993 | Finke | 55/337 |
| 6,341,404 | B1 | 1/2002 | Salo et al. | |
| 6,428,589 | B1 | 8/2002 | Bair et al. | |
| 6,436,160 | B1 | 8/2002 | Stephens et al. | |
| 6,829,804 | B2 * | 12/2004 | Sepke | 15/347 |
| 7,140,068 | B1 * | 11/2006 | Vander Baan et al. | 15/347 |
| 2002/0194695 | A1 | 12/2002 | Stephens et al. | |
| 2003/0066156 | A1 | 4/2003 | Yang | |
| 2004/0060146 | A1 | 4/2004 | Coates et al. | |

FOREIGN PATENT DOCUMENTS

| | | | |
|---|---|---|---|
| CN | 1177284 | A | 3/1988 |
| DE | 1282872 | | 11/1968 |
| DE | 10153890 | | 10/2002 |
| EP | 0489565 | | 6/1995 |

(Continued)

OTHER PUBLICATIONS

Japanese Patent Office, Office Action issued Nov. 21, 2006, with respect to Japanese Patent Application No. 2004-104823 filed Mar. 31, 2004.

(Continued)

*Primary Examiner*—David B Thomas
(74) *Attorney, Agent, or Firm*—Blank Rome LLP

(57) ABSTRACT

The vacuum cleaner having a suction port assembly and a dust collecting chamber includes a first air inlet path to connect the suction port assembly and the dust collecting chamber, a second air inlet path to connect a lower end of the dust collecting chamber and a vacuum generator, a cyclone dust collecting device detachably mounted in the dust collecting chamber so that an upper end is connected to the first air inlet path and a lower end is connected to the second air inlet path, and a filtering chamber integrally formed with the cyclone dust collecting device and having a filter member detachably disposed. As the second air inlet path requires less space, it is feasible to easily manufacture the vacuum cleaner and maintain the filtering chamber and the cyclone dust collecting device at a time. Therefore, maintenance of the vacuum cleaner becomes more convenient.

23 Claims, 3 Drawing Sheets

FOREIGN PATENT DOCUMENTS

| | | | |
|---|---|---|---|
| GB | 2321181 | | 7/1998 |
| GB | 2368269 | A | 5/2002 |
| GB | 2373997 | A | 10/2002 |
| GB | 2395109 | A | 5/2004 |
| JP | 58-86056 | | 6/1983 |
| JP | 2003-116753 | | 4/2003 |
| SU | 372992 | | 6/1973 |
| WO | WO 02/28260 | A1 | 4/2002 |
| WO | WO 2005/053494 | A3 | 6/2005 |

OTHER PUBLICATIONS

Canadian Patent Office, Office Action issued Aug. 17, 2006, with respect to Canadian Application No. 2,466,820 filed May 11, 2004.

Spanish Patent Office, State of the Art Report issued Jun. 6, 2006 with respect to Spanish Patent Application No. 200401145 filed May 13, 2004.

German Patent Office, Office Action dated Jun. 8, 2006, with respect to German Patent Application No. 102004024888.5 filed May 19, 2004.

French Patent Office, Preliminary Search Report issued Apr. 14, 2006 with respect to French Patent Application No. 04 05214 filed on May 13, 2004.

Chinese Patent Office, Office Action issued Nov. 11, 2005 with respect to Chinese Patent Application No. 200410044668.2 filed on May 19, 2004.

Official Action from Russian Patent Office.

Australian Patent Office, Office Action dated Jun. 1, 2005, issued in connection with corresponding Application No. 2004201748.

Combined Search and Examination Report under Sections 17 and 18(3) dated Oct. 12, 2004.

* cited by examiner

CYCLONE DUST COLLECTING DEVICE AND VACUUM CLEANER HAVING THE SAME

REFERENCE TO RELATED APPLICATION

This application claims priority to Korean Patent Application No. 2003-32152, filed May 21, 2003 in the Korean Intellectual Property Office, which is incorporated herein by reference in its entirety.

CROSS-REFERENCE TO RELATED APPLICATIONS

This application is related to copending applications entitled "Filter Cleaning Device of Cyclone Vacuum Cleaner" (Korean Application No. 2003-19951, filed Sep. 9, 2003), "Cyclone-Type Dust Collecting Apparatus for Vacuum Cleaners" (Korean Application No. 2002-0077811, filed Sep. 12, 2003), and "Cyclone Type Dust Collecting Apparatus for Vacuum Cleaner" (Korean Application No. 2003-33167, filed Oct. 10, 2003) whose disclosures are commonly owned by the same assignee as the present applications and are entirely incorporated herein by reference.

FIELD OF THE INVENTION

The present invention generally relates to a vacuum cleaner, and more specifically, to a cyclone dust collecting device of the vacuum cleaner, which centrifugally separates and collects dust from the suctioned air.

BACKGROUND OF THE INVENTION

Conventional vacuum cleaners perform a cleaning operations by drawing in air containing contaminants found on a surface to be cleaned. A typical vacuum cleaner includes a vacuum cleaner body having a vacuum generator therein, a suction port assembly to draw in contaminated air on the surface to be cleaned by using suction generated by the vacuum generator, and a dust collecting device that separates contaminants from air. Some conventional vacuum cleaners use a cyclone dust collecting device which centrifugally separates and collects the contaminants from the drawn in air.

Referring to FIG. 1, a conventional upright-type vacuum cleaner 100 includes a cleaner body 110 and a cyclone dust collecting device 180. The cleaner body 110 has a the vacuum generator 130 inside and a dust collecting chamber 140 formed in an upper portion of the vacuum generator 130, with the cyclone dust collecting device 180 being detachably mounted thereon. The dust collecting chamber 140 is in fluid communication with a suction port assembly 120 through a first air inlet path 160. The vacuum generator 130 is in fluid communication with the dust collecting chamber 140 through a second air inlet path 170. Each air inlet path 160 and 170 is connected to an upper end of the dust collecting chamber 140, respectively, and connected to an upper end portion of the cyclone dust collecting device 180 when the cyclone dust collecting device 180 is mounted on the dust collecting chamber 140.

A filter member 191 is disposed in the second air inlet path 170 to the filter dust contained in the air discharged from the cyclone dust collecting device 180. The filter member 191 is detachably installed in a filtering chamber 190 formed in cleaner body 110 so that the filter member 191 is interposed between the second air inlet path 170 and the vacuum generator 130, separately from the cyclone dust collecting device 180.

The second air inlet path 170 of the vacuum cleaner 100 is connected to the vacuum generator 130 in a roundabout pattern along a side and a bottom of the cyclone dust collecting device 180, through which air discharged from the upper end of the the cyclone dust collecting device 180 flows. Hence, the cleaner body 110 is bulky and requires a complicated manufacturing process.

In addition, it is inconvenient to support the cyclone dust collecting device 180 and the filter member 191 separately.

SUMMARY OF THE INVENTION

Accordingly, an object of the present invention is to provide a vacuum cleaner with cyclone dust collecting device which enables a simple-structured cleaner body.

The foregoing object is attained by a vacuum cleaner that includes a suction port assembly to draw in contaminants on a surface to be cleaned; a cleaner body that has a vacuum generator connected to the suction port assembly through first and second air inlet paths with a dust collecting chamber interposed between the first and second air inlet paths; and a cyclone dust collecting device detachably mounted in the dust collecting chamber so that the cyclone dust collecting device is connected to the first and second air inlet paths, respectively. The first air inlet path connects the cyclone dust collecting device with the suction port assembly, and the second air inlet path connects the vacuum generator disposed at a lower portion of the dust collecting chamber with a lower end of a cyclone body.

The cyclone dust collecting device includes a cyclone body and an air inlet pipe. The cyclone body has a first through hole connected to the first air inlet path, a second through hole formed at a lower end to be connected to the second air inlet path, and a cyclone chamber to centrifugally separate the contaminants from air drawn in through the first through hole and collect the contaminants therein. The air inlet pipe has an inlet port disposed in the cyclone chamber and an outlet port disposed in a bottom side of the cyclone chamber in which the contaminants are stacked and connected to the second through hole.

Accordingly, the second air inlet path requires less space for installation, thereby making manufacture of the vacuum cleaner easier.

The cyclone body further includes a filter member interposed between the outlet port of the air inlet pipe and the second through hole to separate dust from the air discharged from the cyclone chamber.

The cyclone body includes a filtering chamber formed between the outlet port of the air inlet pipe and the second through hole, and the filter member is detachably disposed in the filtering chamber.

Because the cyclone body is integrally formed with the filtering chamber, the cyclone body and the filtering chamber can be maintained at the same time.

The outlet port of the air inlet pipe is formed in a conical shape gradually increasing in a cross section toward a lower portion of the cyclone body. Also, the outlet port of the air inlet pipe divides the cyclone chamber from the filtering chamber.

A filter member is detachably disposed in the filtering chamber to separate fine dust from the clean air flowing to the second through hole.

The filtering chamber is exposed and closed by a covering member disposed at a lower end of the cyclone body, and the second through hole is located in the covering member.

The filtering chamber is provided with an adhesion preventing member to prevent the filter member from blocking the second through hole due to the flow of clean air moving to the second through hole. The adhesion preventing member is integrally formed and extends from the covering member, and includes at least one adhesion preventing rib to support the filter member when the covering member is closed.

The cyclone body further includes a fixed cyclone head unit with the first through hole being connected to the first inlet path, and a dust receptacle detachably connected to the cyclone head unit, thereby forming the cyclone chamber.

The dust receptacle includes a first space forming the cyclone chamber when the dust receptacle and the cyclone head unit are connected to each other, and a second space in fluid communication with the first space through the air inlet pipe and exposed and closed by a covering member which is hinged to a lower end of the dust receptacle. The second through hole is formed in the covering member.

The dust receptacle and the covering member are formed of a transparent material. At a side of the dust receptacle, a grip is formed.

A latching unit is disposed at a side of each of the dust receptacle and the covering member, respectively, in a complementary manner to securely fix the covering member when the covering member covers the lower end of the dust receptacle.

A first sealing member is disposed between the lower end of the cyclone head unit and an upper end of the dust receptacle to seal the cyclone chamber when the cyclone head unit and the dust receptacle are connected to each other.

The air inlet pipe includes a first tube and a second tube. The first tube is fixed at the cyclone head unit, and has an inlet port disposed at an upper portion of the cyclone chamber and a lower end which is open. The second tube has an upper end which is open so as to connect with the lower end of the first tube when the cyclone head unit and the dust receptacle are connected to each other, and a lower end penetrating through the bottom side of the cyclone chamber and connected to the second through hole so providing fluid communication therebetween.

The air inlet pipe is provided with a back-flow preventing skirt disposed at an outer circumference of an inner side of the cyclone chamber to prevent the contaminants stacked at a lower side of the cyclone chamber from flowing.

The inlet port of the air inlet pipe is formed in a grill shape.

BRIEF DESCRIPTION OF THE DRAWINGS

The above aspects, and other features and advantages of the present invention will become more apparent by the following detailed description when taken in conjunction with the drawings.

DETAILED DESCRIPTION OF THE PREFERRED EMBODIMENT

Referring to the accompanying drawings, the present invention will be described according to an embodiment of the present invention.

Figure 2:
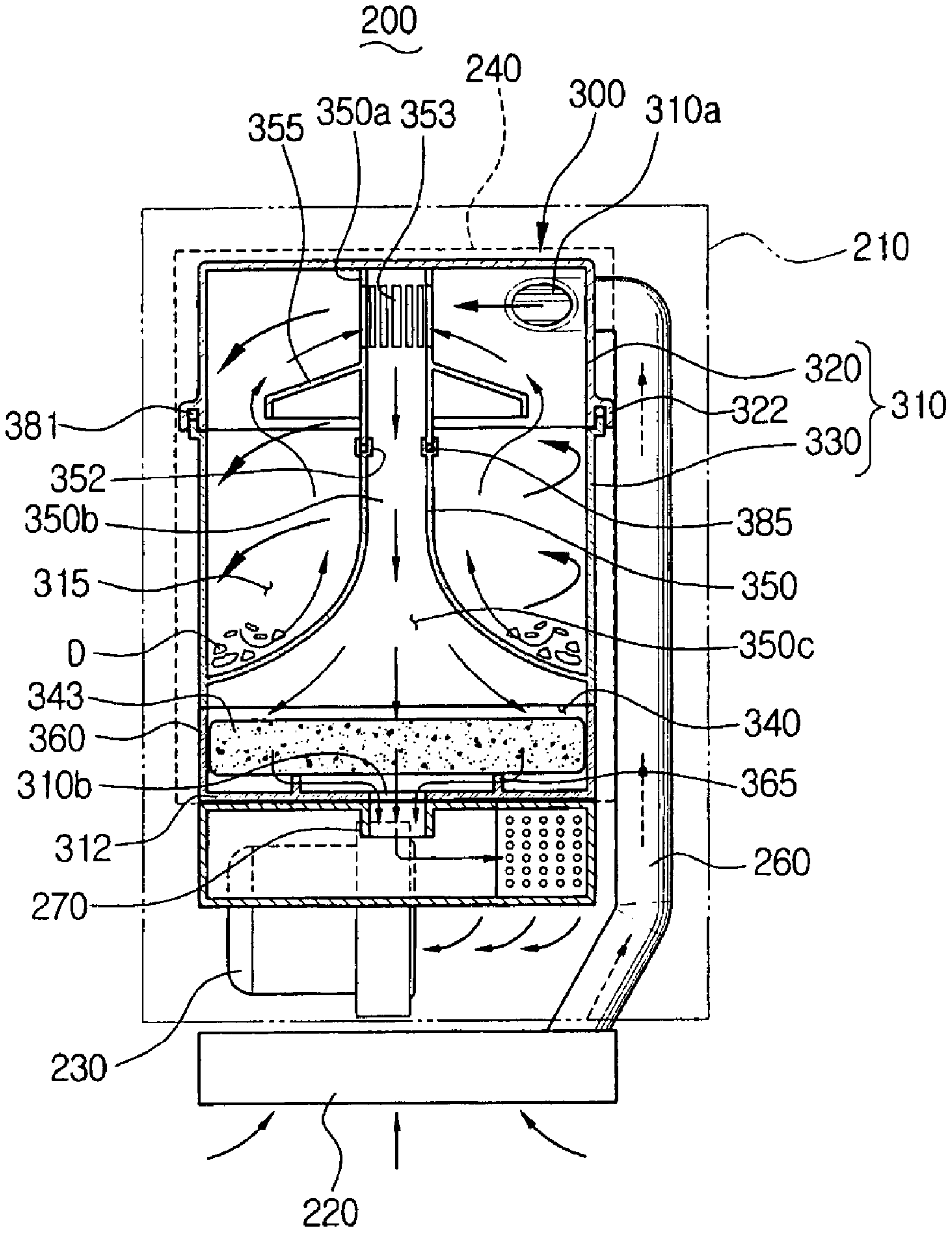
FIG. 2 is a side elevational view in section illustrating a vacuum cleaner in accordance with an embodiment of the present invention.
Figure 3:
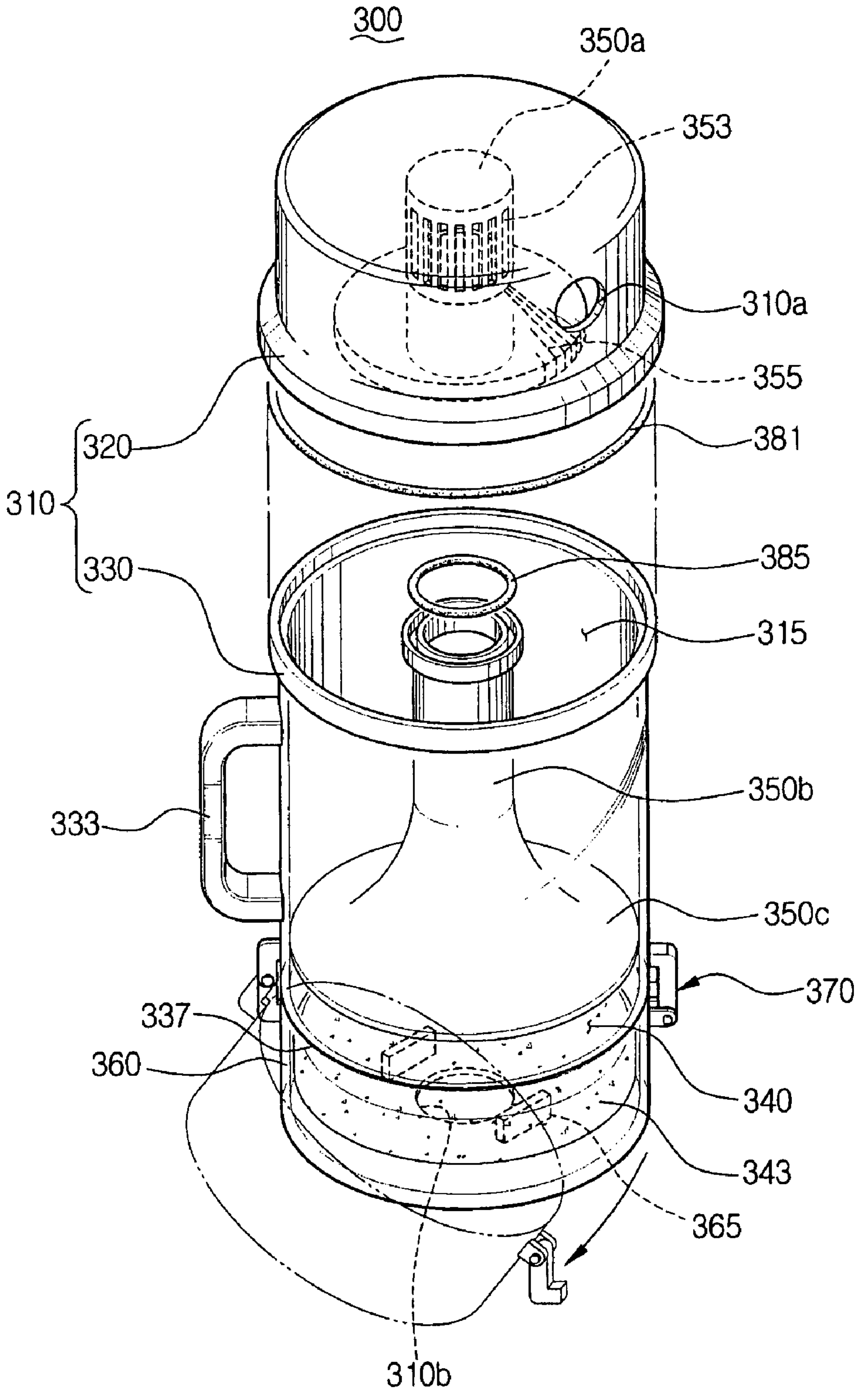
FIG. 3 is an exploded perspective view illustrating a cyclone dust collecting of the vacuum cleaner illustrated in FIG. 2.

FIGS. 2 and 3 are views illustrating an upright-type vacuum cleaner, by way of example, having a cyclone dust collecting device according to an embodiment of the present invention.

Referring to FIGS. 2 and 3, a vacuum cleaner 200 includes a cleaner body 210, a suction port assembly 220, first and second air inlet paths 260 and 270, and a cyclone dust collecting device 300.

The cleaner body 210 has a vacuum generator 230 and a dust collecting chamber 240 on which the cyclone dust collecting device 300 is detachably mounted. The dust collecting chamber 240 is interposed between the first and second air inlet paths 260 and 270. The first air inlet path 260 is connected to the suction port assembly 220. The second air inlet path 270 is connected to the vacuum generator 230. The vacuum generator 230 is disposed under a lower portion of the dust collecting chamber 240. First air inlet path 260 interconnects an upper end portion of dust collecting chamber 240 with the suction port assembly 220. The second air inlet path 270 interconnects a lower end of the dust collecting chamber 240 with the vacuum generator 230. As constructed above, the second air inlet path 270 takes up less space, as compared to the inlet of a conventional vacuum cleaner. The cleaner body 210 thus has a smaller size and a simplier structure.

In order to configure the second air inlet path 270 as described above, the cyclone dust collecting device 300 includes a cyclone body 310 and an air inlet pipe 350.

The cyclone body 310 has a cyclone head unit 320 and a dust receptacle 330, which are detachably connected to each other. Between the cyclone head unit 320 and the dust receptacle 330, a first sealing member 381 is disposed to seal a the cyclone chamber 315 in connecting the cyclone head unit 320 and the dust receptacle 330.

The cyclone head unit 320 is fixed at the upper end portion of the dust collecting chamber 240, and has a first through hole 310*a* formed at one end for connecting to the first air inlet path 260.

The dust receptacle 330 is detachably connected to a lower end 322 of the cyclone head unit 320, and has first and second spaces 315 and 340 formed therein and a grip 333 (FIG. 3) extending from a side of receptacle 330 for easy gripping of the dust receptacle 330. The first space 315 forms a cyclone chamber when the dust receptacle 330 and the cyclone head unit 320 are connected to each other. Contaminants from drawn air are separated and collected in the cyclone chamber 315. The second space 340 is exposed and closed by a covering member 360 which is rotatably hinged to the lower end 337 of the dust receptacle 330. When the second space 340 is closed by the covering member 360, a filtering chamber is formed. The covering member 360 has a second through hole 310*b*. While the covering member 360 covers an open end of the filtering chamber 340 and the dust receptacle 330 is connected to the cleaner body 210, the cyclone dust collecting device 300 can be in fluid communication with the second air inlet path 270 through the second through hole 310*b*. The covering member 360 is locked by a predetermined locking means, which can be a latching unit 370 disposed so as to correspond to the covering member 360 and the dust receptacle 330, respectively.

The air inlet pipe 350 guides the almost clean air, from which most contaminants D (FIG. 2) are separated in the cyclone chamber 315, to the second through hole 310*b* formed at a lower end 312 of the cyclone body 310. The air inlet pipe 350 has first and second tubes 350*a* and 350*b* that are connected to each other, and a second sealing member 385 inserted between the first and second tubes 350*a* and 350*b* when the cyclone head unit 320 and the dust receptacle 330 are connected.

The first tube 350*a* is fixed at the cyclone head unit 320 so that the first tube 350*a* can be located at an upper end of the cyclone chamber 315, and has an opening at a lower end of cyclone chamber 315. At least one slit 353 is formed at a side of the first tube 350*a*, which is in fluid communication with the cyclone chamber 315. Slit 353 may be formed in various shapes, yet it is preferably formed in a grill shape to enhance the dust collecting efficiency of cyclone dust collecting device 300.

The second tube 350*b* has an upper end 352 which is open in the cyclone chamber 315. The upper end 352 of the second tube 350*b* is in fluid communication with the lower end of the first tube 350*a* when the dust receptacle 330 and the cyclone head unit 320 are connected to each other. The second tube 350*b* also has an outlet port 350*c* at a lower end thereof, which penetrates through a bottom side of the cyclone chamber 315 and is in fluid communication with the second through hole 310*b*.

The air inlet pipe 350 may be various shapes to enhance the dust collecting efficiency of the cyclone dust collecting device 300. The air inlet pipe 350 includes a back-flow preventing skirt 355 disposed at an outer circumference of the first tube 350*a* located in the cyclone chamber 315 to prevent the contaminants D piled in cyclone chamber 315 from flowing into an air current ascending toward slit 353 of the air inlet pipe 350.

The vacuum cleaner 200 configured as aforementioned further includes a filtering chamber 340 to additionally separate dust contained in the air discharged from the cyclone chamber 315, thereby enhancing the cleaning efficiency of the vacuum cleaner 200. The filtering chamber 340 is disposed at the lower end portion of the cyclone body 310, that is at the lower end of the dust receptacle 330. Hence, when the dust receptacle 330 is separated from the cyclone head unit 320, the filtering chamber 340 is also separated from the cleaner body 210 so that a user can conveniently maintain the dust receptacle 330 and the filtering chamber 340 together, thereby facilitating the maintenance of the vacuum cleaner 200.

The filtering chamber 340 is in fluid communication with the cyclone chamber 315 through the air inlet pipe 350 and has a filter member 343, such as sponges which are detachably disposed therein. By rotating the covering member 360, the filtering chamber 340 is exposed and closed. Accordingly, to replace or clean the filter member 343, the covering member 360 is manipulated to expose the filtering chamber 340. The covering member 360 and the dust receptacle 330 are formed of a transparent material, such as an acryl, so as to allow observation of the inside of the filtering chamber 340 and the cyclone chamber 315. Hence, the user can visually check whether cleaning of the dust receptacle 330 and the filter member 343 is required, thereby making the maintenance of the dust receptacle 330 and the filtering chamber 340 more convenient.

The filtering chamber 340 as configured above further includes an adhesion preventing member 365 therein to prevent the filter member 343 from blocking the second through hole 310*b* due to the flow of clean air moving toward the second through hole 310*b* when the vacuum generator 230 is driven. The adhesion preventing member 365 may be formed in various shapes such as one or more ribs that are integrally formed and extending from the covering member 360 to support the filter member 343 when the covering member 360 is closed.

The outlet port 350*c* of the air inlet pipe 350 is formed in a conical shape which gradually increases in cross section toward the lower end of cyclone body 310. The outlet port 350*c* of air inlet pipe 350 divides the inside of the dust receptacle 330 into the cyclone chamber 315 and the filtering chamber 340. Accordingly, the speed of clean air discharged through the outlet port 350*c* of the air inlet pipe 350 can be decreased to enhance the dust separating efficiency of the filter member 343.

Figure 1:
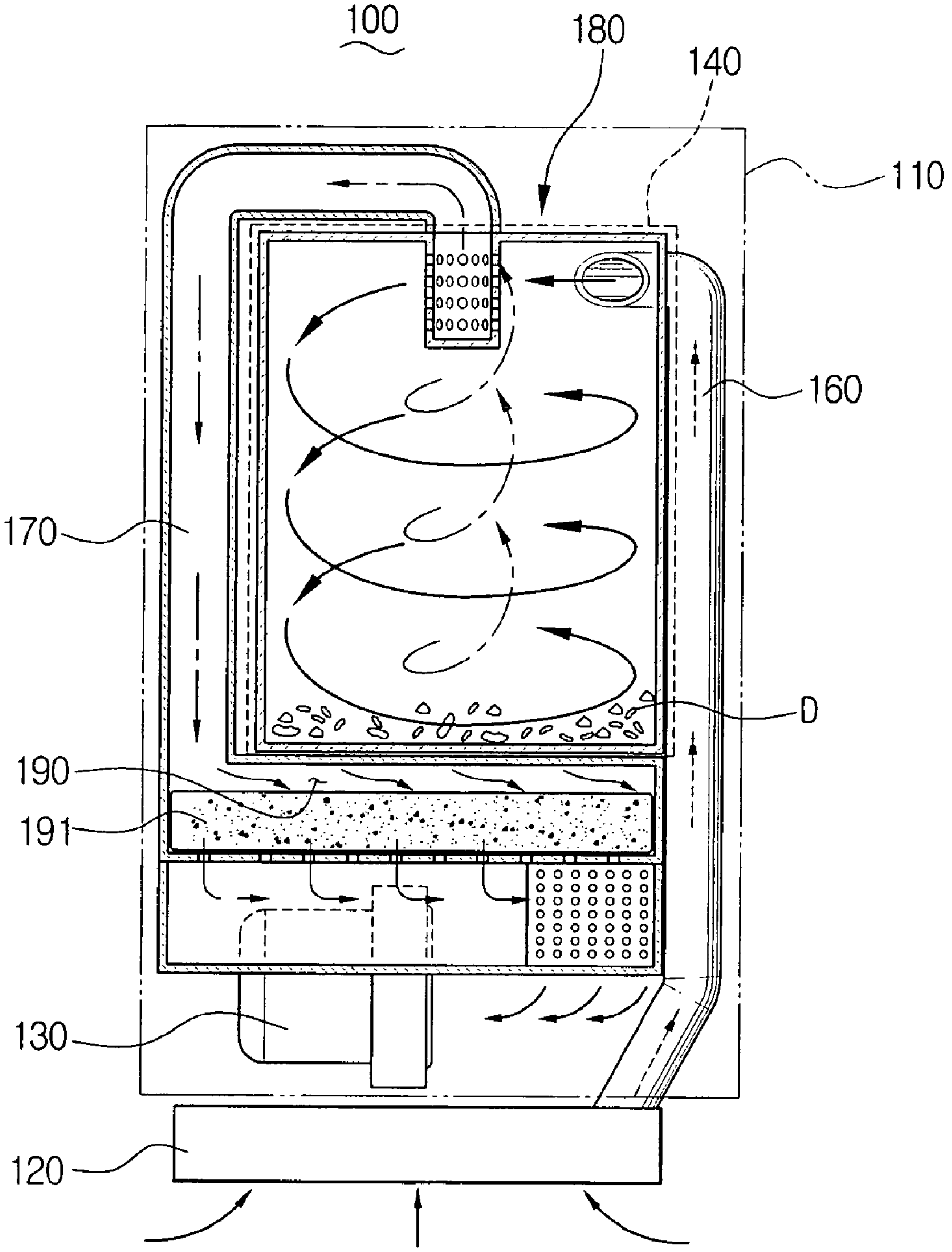
FIG. 1 (PRIOR ART)
FIG. 1 is a side elevational view in section illustrating an inner structure of an upright-type vacuum cleaner having a conventional cyclone dust collecting device.

The second air inlet path 270, which guides clean air discharged from the cyclone dust collecting device 300, requires less space than the conventional second air inlet path 170 of FIG. 1, thereby making manufacture of the vacuum cleaner 200 easier.

Because the filtering chamber 340 is integrally formed with the dust receptacle 330 and allows the user to observe the inside of not only the cyclone dust collecting device 300, but also the filtering chamber 340, maintenance of the vacuum cleaner 200 is more convenient.

Although one embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A cyclone dust collecting device for a vacuum cleaner, which is interposed between a first air inlet path connected to a suction port assembly and a second air inlet path connected to a vacuum generator of the vacuum cleaner, comprising:

a cyclone body having a first through hole connected to the first air inlet path, a second through hole formed at a lower end to be connected to the second air inlet path, and a cyclone chamber adapted to centrifugally separate contaminants from air drawn into the chamber through the first through hole and collect the contaminants therein; and an air inlet pipe having an inlet port disposed in the cyclone chamber and an outlet port penetrating through a bottom side of the cyclone chamber in which the contaminants are stacked and connected to the second through hole, wherein the outlet port of the air inlet pipe is formed in a shape which gradually increases in diameter toward a lower portion of the cyclone body.

2. The cyclone dust collecting device of claim 1, wherein the cyclone body further comprises a filter member interposed between the outlet port of the air inlet pipe and the second through hole to separate dust from the air which is discharged from the cyclone chamber and flows toward the second through hole.

3. The cyclone dust collecting device of claim 2, wherein the cyclone body includes a filtering chamber formed between the outlet port of the air inlet pipe and the second through hole, and the filter member is detachably disposed in the filtering chamber.

4. The cyclone dust collecting device of claim 3, wherein the outlet port of the air inlet pipe is formed in a conical shape, and defining the filtering chamber.

5. The cyclone dust collecting device of claim 4, wherein the filtering chamber is exposed and closed by a covering member disposed at the lower end of the cyclone body, and the second through hole penetrates through the covering member.

6. The cyclone dust collecting device of claim 5, wherein the filtering chamber is provided with an adhesion preventing member to prevent the filter member from blocking the second through hole due to the flow of the clean air moving to the second through hole.

7. The cyclone dust collecting device of claim 6, wherein the adhesion preventing member is integrally formed with and protruding from the covering member, and includes at least one adhesion preventing rib to support the filter member when the covering member is closed.

8. The cyclone dust collecting device of claim 1, wherein the cyclone body further comprises:

a cyclone head unit having a first through hole connected to the first inlet path; and a dust receptacle detachably connected to the cyclone head unit and forming the cyclone chamber.

9. The cyclone dust collecting device of claim 8, wherein the dust receptacle comprises:

a first space to form the cyclone chamber when the dust receptacle and the cyclone head unit are connected to each other; and a second space in fluid communication with the first space through the air inlet pipe, and the second space being exposed and closed by a covering member which is hinged to a lower end of the dust receptacle, wherein the second through hole penetrates through the covering member.

10. The cyclone dust collecting device of claim 9, wherein the dust receptacle and the covering member are formed of a transparent material.

11. The cyclone dust collecting device of claim 9, wherein a latching unit is disposed at a side of each of the dust receptacle and the covering member in a complementary manner to fix the covering member when the covering member covers the lower end of the dust receptacle.

12. The cyclone dust collecting device of claim 8, a grip is formed at a side of the dust receptacle.

13. The cyclone dust collecting device of claim 8, wherein the air inlet pipe comprises:

a first tube fixed at the cyclone head unit and having an inlet port disposed at an upper portion of the cyclone chamber and a lower end which is open; and a second tube having an upper end connected with the lower end of the first tube when the cyclone head unit and the dust receptacle are connected to each other, and a lower end penetrating through the bottom side of the cyclone chamber and being in fluid communication with the second through hole.

14. The cyclone dust collecting device of claim 1, wherein the air inlet pipe is provided with a back-flow preventing skirt disposed within the cyclone chamber.

15. The cyclone dust collecting device of claim 1, wherein the inlet port of the air inlet pipe has a grill shape.

16. The cyclone dust collecting device of claim 1, wherein the lower end of the inlet pipe serves as the bottom of the dust collecting chamber so as to collect dust in addition to functioning as an outlet port.

17. A vacuum cleaner comprising:

a suction port assembly to draw in contaminants on a surface to be cleaned;

a cleaner body having a vacuum generator connected to the suction port assembly through first and second air inlet paths with a dust collecting chamber interposed between the first and the second air inlet paths; and a cyclone dust collecting device detachably mounted in the dust collecting chamber and connected to first and second air inlet paths, respectively, wherein the first air inlet path connects the cyclone dust collecting device with the suction port assembly, and the second air inlet path connects the vacuum generator disposed at a lower portion of the dust collecting chamber with a lower end of the cyclone dust collecting device wherein the cyclone dust collecting device comprises:

a cyclone body having a first through hole connected to the first air inlet path, a second through hole formed at a lower end of the cyclone body and connected to the second air inlet path, and a cyclone chamber adopted to centrifugally separate contaminants from air drawn in through the first through hole and collect the contaminants therein; and an air inlet pipe having an inlet port disposed in the cyclone chamber and an outlet port penetrating through a bottom side of the cyclone chamber in which the contaminants are stacked and connected to the second through hole, and the air inlet pipe to guide the clean air discharged from the cyclone chamber to the second through hole, wherein the outlet port of the air inlet pipe is formed in a shape which gradually increases in diameter toward a lower portion of the cyclone body.

18. The vacuum cleaner of claim 17, wherein the cyclone body further comprises a filter member interposed between the outlet port of the air inlet pipe and the second through hole to separate dust from the air discharged from the cyclone chamber flowing toward the second through hole.

19. The vacuum cleaner of claim 18, wherein the cyclone body includes a filtering chamber formed between the outlet port of the air inlet pipe and the second through hole, and the filter member is detachably disposed in the filtering chamber.

20. The vacuum cleaner of claim 19, wherein the outlet port of the air inlet pipe is formed in a conical shape, and dividing the cyclone chamber from the filtering chamber.

21. The vacuum cleaner of claim 16, wherein the cyclone body further comprises:

a cyclone head unit having the first through hole connected to the first inlet path; and a dust receptacle detachably connected to the cyclone head unit and forming the cyclone chamber.

22. The vacuum cleaner of claim 21, wherein the dust receptacle comprises:

a first space to form the cyclone chamber when the dust receptacle and the cyclone head unit are connected to each other; and a second space fluidly communicating with the first space through the air inlet pipe and exposed and closed by a covering member which is hinged to a lower end of the dust receptacle, wherein the second through hole penetrates through the covering member.

23. The vacuum cleaner of claim 17, wherein the lower end of the inlet pipe serves as the bottom of the dust collecting chamber so as to collect dust in addition to functioning as an outlet port.

* * * * *